(12) United States Patent  (10) Patent No.: US 8,168,251 B2
Prinz et al.  (45) Date of Patent: May 1, 2012

(54) METHOD FOR PRODUCING TAPERED METALLIC NANOWIRE TIPS ON ATOMIC FORCE MICROSCOPE CANTILEVERS

(75) Inventors: Friedrich B. Prinz, Woodside, CA (US); Neil Dasgupta, Menlo Park, CA (US); Munekazu Motoyama, Kumamoto (JP)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 806 days.

(21) Appl. No.: 12/287,721

(22) Filed: Oct. 10, 2008

(65) Prior Publication Data

US 2010/0089866 A1  Apr. 15, 2010

(51) Int. Cl.
*B05D 5/12* (2006.01)

(52) U.S. Cl. ............... 427/78; 427/526; 204/192.1
(58) Field of Classification Search ............ 427/248.1, 427/78, 526; 204/192.1
See application file for complete search history.

(56) References Cited

U.S. PATENT DOCUMENTS

| 7,105,428 | B2 | 9/2006 | Pan et al. | |
| 7,572,300 | B2* | 8/2009 | Cohen et al. | 850/58 |
| 2007/0188182 | A1* | 8/2007 | Wang et al. | 324/754 |
| 2007/0277866 | A1* | 12/2007 | Sander et al. | 136/230 |
| 2009/0045720 | A1* | 2/2009 | Lee et al. | 313/503 |
| 2010/0124530 | A1* | 5/2010 | Lusk et al. | 423/447.3 |

* cited by examiner

*Primary Examiner* — Queenie Dehghan
(74) *Attorney, Agent, or Firm* — Lumen Patent Firm

(57) ABSTRACT

A method of making nanowire probes is provided. The method includes providing a template having a nanoporous structure, providing a probe tip that is disposed on top of the template, and growing nanowires on the probe tip, where the nanowires are grown from the probe tip along the nanopores, and the nanowires conform to the shape of the nanopores.

5 Claims, 11 Drawing Sheets

600

(b)

(c)

METHOD FOR PRODUCING TAPERED METALLIC NANOWIRE TIPS ON ATOMIC FORCE MICROSCOPE CANTILEVERS

FIELD OF THE INVENTION

The invention relates generally to nanostructures. More particularly, the invention relates to a method for producing metallic nanowire probes with tapered tips for use in general probe applications.

BACKGROUND

Scanning electrochemical microscopy (SECM) and atomic force microscopy (AFM) are imaging techniques, which can allow the structure or reactivity of a sample surface to be imaged with precision below the micrometer scale. SECM is a type of microscopy that images surfaces using a physical probe. By mechanically moving the probe across a surface, an accurate image of the surface can be mapped. Diameters of existing SECM electrodes are larger than one micrometer and exhibit an electric field that is generally non-localized along the electrode surface. The AFM cantilever tips holding carbon nanotubes (CNTs) are known and implemented in industry and research. Cantilevers of the AFM with the CNTs improve the sharpness in the topographic measurement, but the conductivity of the CNTs is quite uncertain.

Techniques such as utilizing a sharp corner of the cantilevers for the probing tip, using a silicon nitride pyramid tip, and using a sharp single-crystal silicon tip have been able to achieve good results in resolving relatively flat samples with high resolution. Other fabrication techniques such as etching, deposition, or attachment have been used to microfabricate sharp tips.

Anisotropic etching, isotropic etching, dry etching, oxidation sharpening and focused ion beam (FIB) etching have all been used, and deposition methods include techniques using electron beam induced deposition and diamond-like film deposition. Alternatively, attaching a thin probe to an otherwise conventional tip has been implemented by attaching a zinc oxide whisker to the cantilever end, attaching a carbon nanotube (CNT) or bundles of CNTs to an existing silicon etched tip, and attaching a single nanowire to an existing silicon etched tip.

Nanostructures, and in particular, nanowires are an important aspect of facilitating emerging technologies. A major impediment to the emergence of this new generation of electronic devices based on nanostructures is the ability to effectively grow and harvest nanowires and other nanostructures that have consistent characteristics. Current approaches to grow and harvest nanowires do not facilitate mass production and do not yield consistent nanowire performance characteristics.

Metallic nanowire probes can be used for SECM applications because of their excellent conductivity. As integrated circuit devices continue to become smaller and with the rise in importance of nanotechnology, higher resolution surface studies at the atomic level are becoming more necessary. Higher resolution probes require sharper probe tips to minimize the distortion of images.

While CNT probes have so far shown great potential due to their high aspect ratio and small radius of curvature, as well as being chemically stable and mechanically robust, the difficult and low yield process of mounting an individual single-walled nanotube (SWNT) on an existing probe remains a stumbling block. Methods that directly grow a single CNT by surface growth chemical vapor deposition CVD processes have low yields that can be as low as around 10% for individual CVD SWNT tips. In addition, CNT tips may also give rise to artifacts introduced by the probe tip structure.

What is needed is a method to improve the space resolution of SECM, overcome the uncertainty of the electronic conductivity of AFM-CNT tips and enable control of the longitudinal composition distribution of the tips.

SUMMARY OF THE INVENTION

To overcome the shortcomings in the art, a method of making nanowire probes is provided. The method includes providing a template having a nanoporous structure. Providing a probe tip that is disposed on top of the template, and growing nanowires on the probe tip, wherein the nanowires are grown from the probe tip along the nanopores, where the nanowires conform to the shape of the nanopores.

In one aspect of the invention, the nanopores are a penetrating pore, where the pore shape can be tapered and controlled by changing a thickness of an atomic layer deposited film.

In another aspect of the invention, the nanopores have a diameter in a range of 10 nm to 100,000 nm.

In a further aspect, the nanopores have a pore density in a range of $1 \times 10^9$ cm$^{-2}$ to $1 \times 10^0$ cm$^{-2}$.

According to another aspect of the invention, the template can be a polycarbonate track etch membrane, porous anodic alumina, track etch mica, or porous silicon.

In another aspect, an insulating metal oxide film is deposited on the template top surface, the template bottom surface and the inner walls of the nanopores. The metal oxide film can be aluminum oxide ($Al_2O_3$), zirconium oxide ($ZrO_2$), yttrium oxide ($Y_2O_3$), hafnium oxide ($HfO_2$), silicon oxide ($SiO_2$), lanthanum oxide ($La_2O_3$), zinc oxide (ZnO), or titanium oxide ($TiO_2$). Here, the metal oxide film can be deposited using atomic layer deposition.

In still a further aspect of the invention, the template is a thin film having a thickness in a range of 1 μm to 50 μm.

In another aspect, the probe tip can be a cantilever atomic force microscope tip or a scanning electrochemical microscopy tip.

In another aspect the probe is coated with a conducting layer. The conducting layer can be platinum gold, silver, copper, iron, nickel, cobalt or palladium. In one aspect the conducting layer is deposited using sputtering or evaporation methods.

According to another aspect of the invention, a probe includes a probe base and the probe tip, where a bottom face of the probe base is adhesively coupled to the template.

In a further aspect, metallic deposition is provided at a region where the tip contacts the template, where metallic nanowires are grown from the probe tip to inside the nanopores. The metallic deposition can be platinum, gold, copper, iron, or palladium deposition. Further, the metallic deposition is by focused-ion-beam (FIB)-assisted deposition. According to one aspect, a cathode material for electrochemical deposition of the metallic nanowires can be platinum gold, copper, iron, or palladium.

According to yet another aspect, the nanowires partially contain gold segments disposed along the nanowires, where the gold segments remain uncovered by an insulating metal oxide deposited during an atomic layer deposition process. Here, an effective probe area and location are controlled by the gold segments.

In a further aspect, FIB-etching is used to remove excessive nanowires from the probe tip.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention is a method of fabricating a metallic nanowire probe with a taper structure to generate an extremely localized electric field and, moreover, provide nanoscale electrochemical measurement. Successful fabrication of AFM cantilevers with the nanowires at the end allows the manipulation of the nanoprobes using existing AFM machines.

Figure 1:
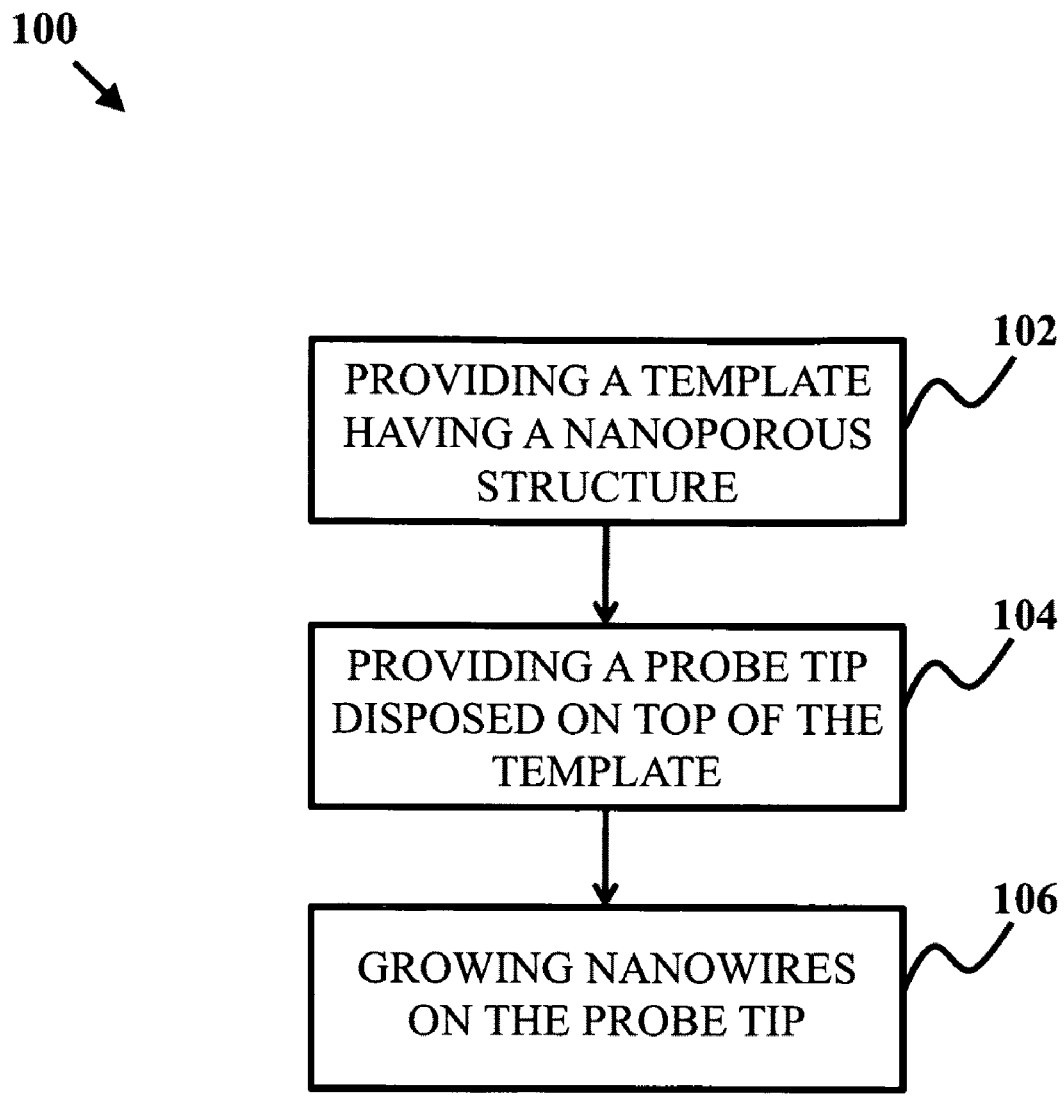
FIG. 1 shows a flow diagram of the steps for fabricating a nanowire probe according to the present invention.

Referring now to the figures. FIG. 1 shows a flow diagram 100 of the steps for fabricating a nanowire probe. The steps include providing a template having a nanoporous structure 102. Providing a probe tip that is disposed on top of the template 104, and growing nanowires on the probe tip 106, wherein the nanowires are grown from the probe tip along the nanopores, where the nanowires conform to the shape of the nanopores.

Figure 2:
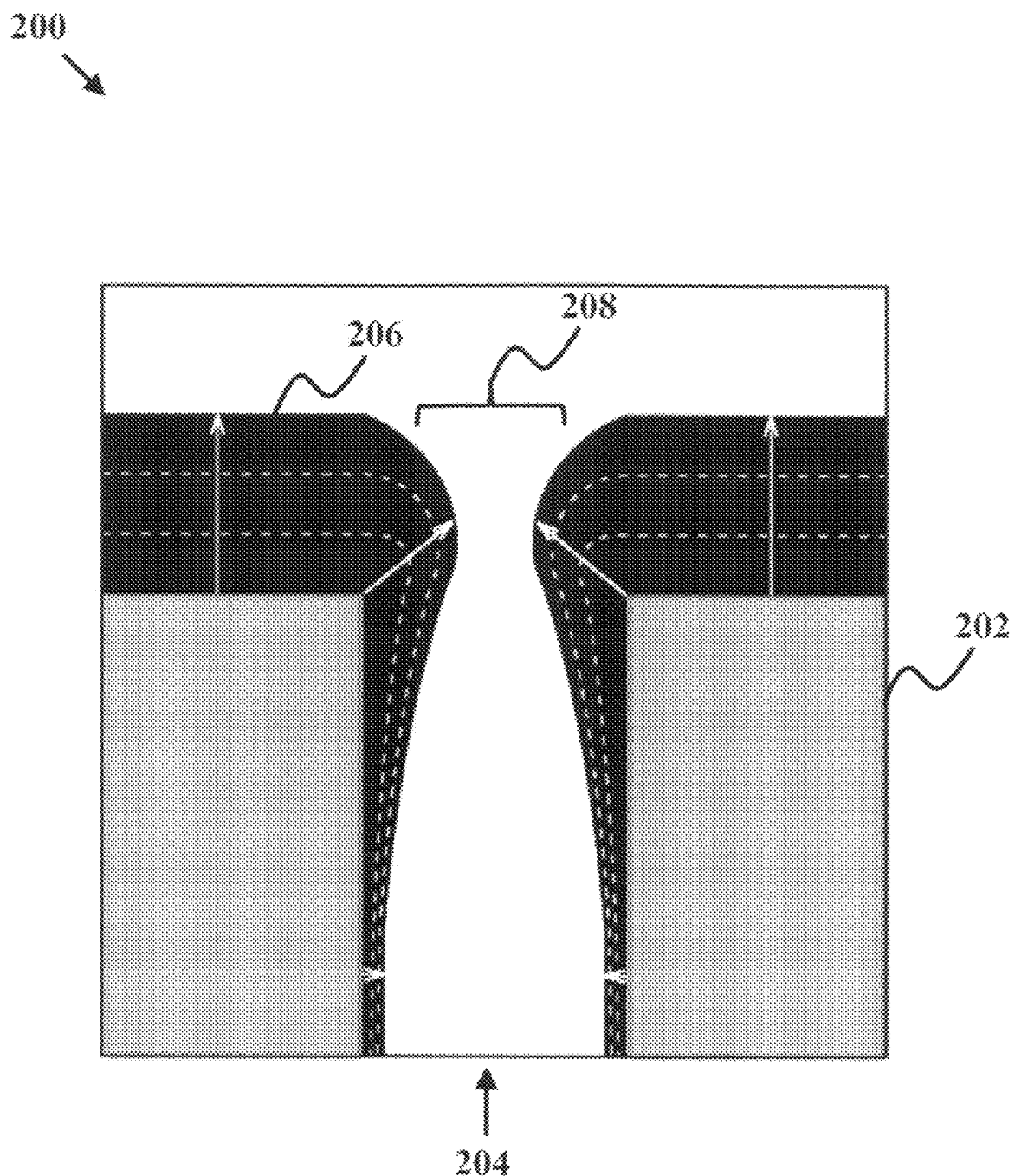
FIG. 2 shows schematic cutaway view of a pore of a nanoporous template coated with an insulating layer using ALD according to the present invention.

FIG. 2 shows schematic cutaway view of a coated pore of a nanoporous template 200, where the coating is an insulating layer using atomic layer deposition (ALD) according to the present invention. Here, a nanoporous template 202 is shown with a single nanopore 204 that is coated with successive insulating layers 206 using the ALD process. The ALD technique is used to entirely cover the surface of a nanoporous template 202, such as a polycarbonate track etch membrane, porous anodic alumina, track etch mica, or porous silicon, with an insulating layer 206 can be an insulating metal oxide such as aluminum oxide ($Al_2O_3$), zirconium oxide ($ZrO_2$), yttrium oxide ($Y_2O_3$), hafnium oxide ($HfO_2$), silicon oxide ($SiO_2$), lanthanum oxide ($La_2O_3$), zinc oxide ($ZnO$), and titanium oxide ($TiO_2$). The nanoporous template 202 is a thin film with a thickness on the order of 1 µm to 50 µm, and it contains straight penetrating pores with a high number density in a range of $1 \times 10^9$ cm$^{-2}$ to $1 \times 10^0$ cm$^{-2}$. The pore diameters can be in a range of 10 nm to 100,000 nm. The insulating layer 206 is deposited not only on the top and bottom surfaces of the template 202 but also on the inner walls of the pores 204 by the ALD process. The ALD thickness along the pores is severely determined by exposure periods for the precursor and oxidizer gas molecules to diffuse into the pores 204. Thus, the tapered profile is controlled by the number of cycles and exposure time of the precursor chemical deposited to the substrate, whereby determining the amount of diffusion into the pores. Reducing the exposure periods results in the non-uniform deposition of the insulating layer 206 along the pores 204. That is, a larger deposition thickness occurs nearer to the pore mouths 208. Thus, the tapered pores 204 can be newly created by the ALD technique.

Figure 3:
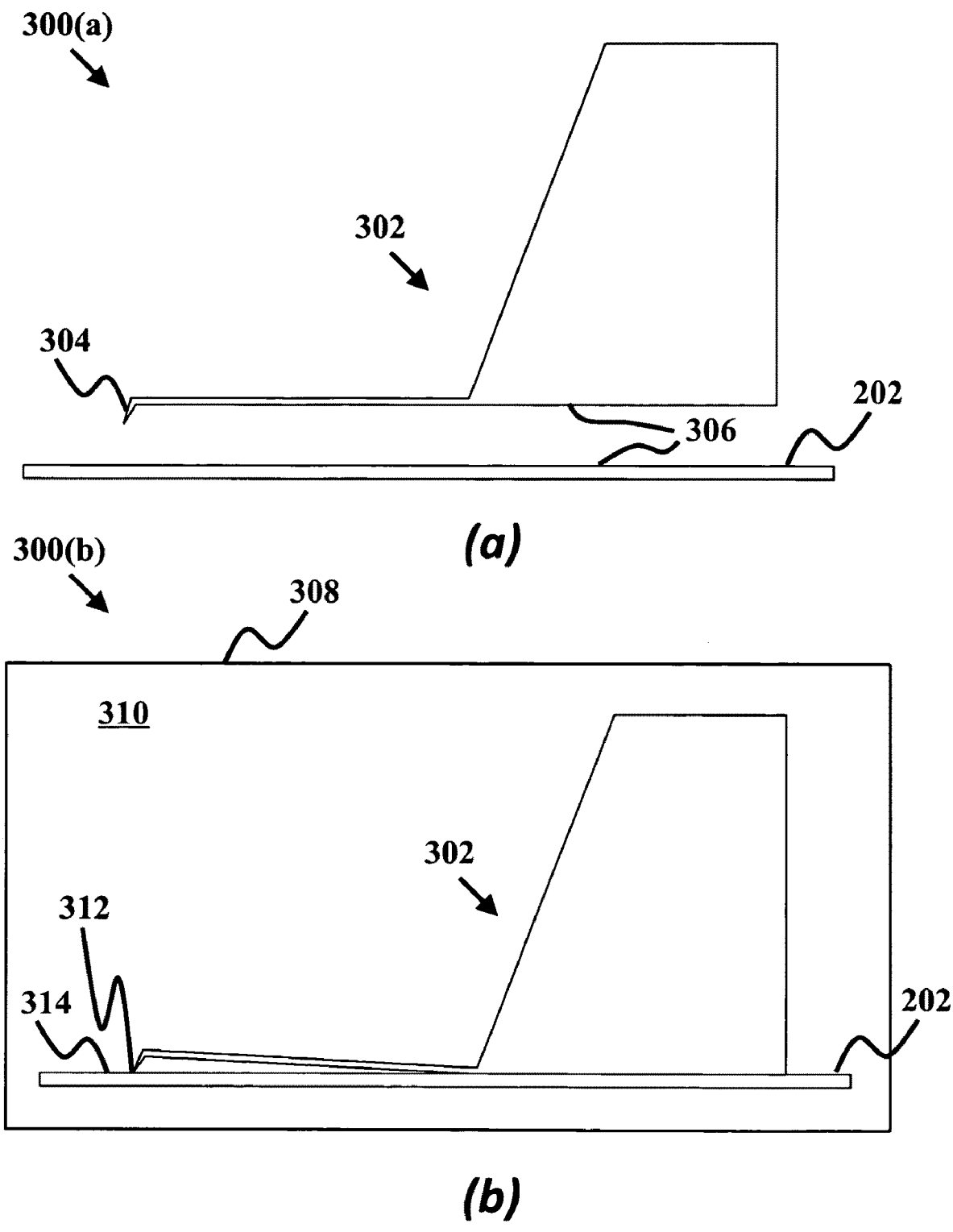
FIGS. 3a-3b show a planar side view of a cantilever probe disposed for connecting to a nanoporous template, and bonded to the template in an electrochemical bath, respectively, according to the present invention.

FIGS. 3a-3b show a planar side view of a cantilever probe disposed for connecting to a nanoporous template 300(a), and bonded to the template in an electrochemical bath 300(b), respectively, according to the present invention. According to the current invention, an AFM cantilever 302 with its probe tip 304 down is placed on the top of the template 202. The entire top surface of the cantilever 302 is coated with a conducting film, such as platinum, gold, silver, copper, iron, nickel, cobalt, or palladium, by sputtering or evaporation methods. The base substrate of the cantilever 302 and the nanoporous template 202 are fixed with a small amount of adhesive 306. Before placing the template 202 and cantilever 302 in an electrochemical cell 308, a local metal deposition 312 onto the cantilever tip contacting with the top surface of the template is carried out by a FIB instrument. The FIB deposited metal can be platinum, gold, copper, iron, or palladium, for example. The deposited metal is the cathode for electrochemical deposition of metallic nanowires. The cantilever 302 with the template 304 is set in an electrochemical cell 308, and an electrolyte solution 310 containing the metal ions, which are the precursors of the nanowires, is injected into the cell 308. Arrays of the nanowires with the taper structures can be produced by the electrochemical deposition.

Figure 4:
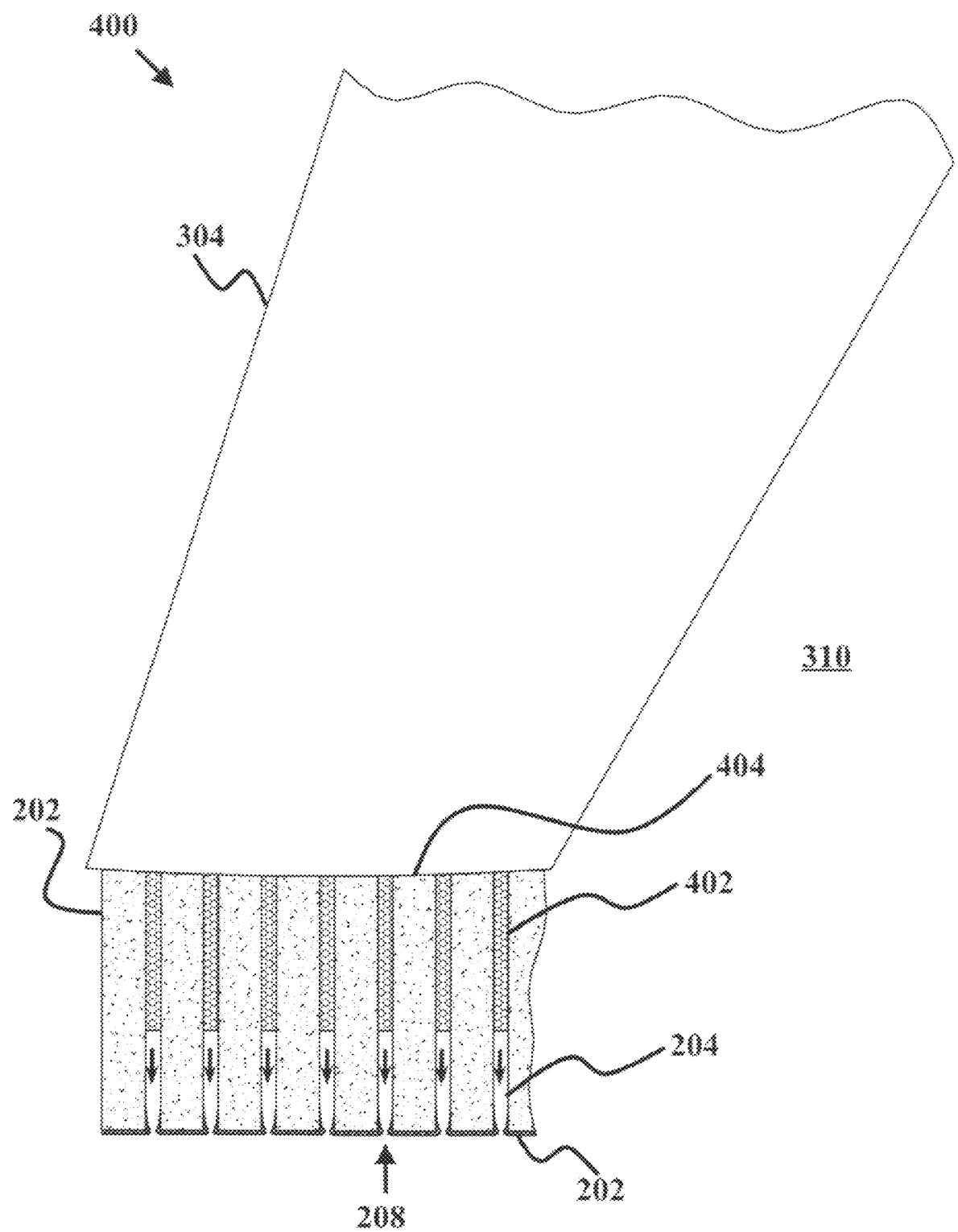
FIG. 4 shows a planar side view of a probe tip disposed on a coated nanoporous template while nanowires are grown by electrochemical deposition according to the present invention.

FIG. 4 shows a planar side view of a probe tip disposed on a coated nanoporous template 400 while nanowires 402 are grown by electrochemical deposition according to the present invention. The electrolyte solution 310 permeates through the pores 204 and pore openings 208. The nanowires 402 start to grow along the pores 204 from the metal cathode 404 on the cantilever tip 304 by applying a sufficiently negative potential to the cathode 404. The shape of the nanowires 402 copies the tapered profile of the pores 204. Hence, the cantilever tip 304 holding a single nanowire 402 with the controlled taper structure can be produced after FIB etching to remove the excessively deposited nanowires 402.

The current invention overcomes the problem of controlling taper structures in the longitudinal direction. The ALD deposition process enables control of the film thickness at the atomic scale, and thus the taper profiles within the pores 204. Thus, the tapered structure of the nanowires 402 can be controlled by changing the ALD thickness.

Figure 5:
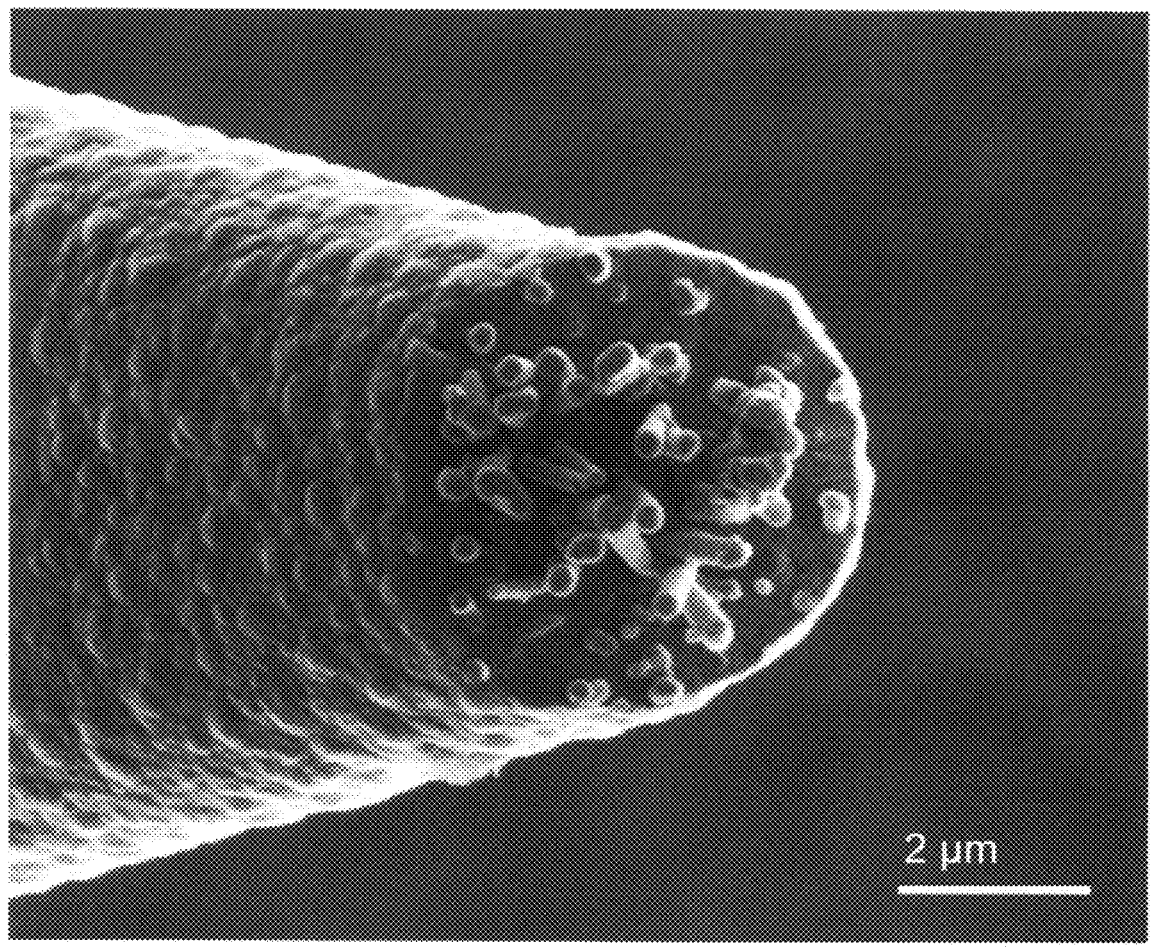
FIG. 5 shows an SEM image of a probe tip having nanowires grown thereon according to the present invention.

FIG. 5 shows an SEM image 500 of a probe tip having nanowires grown thereon according to the present invention.

Figure 6:
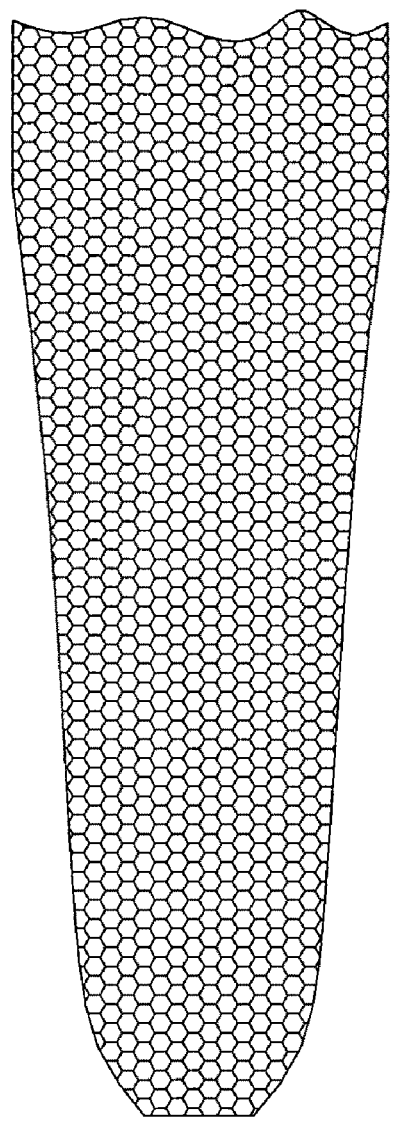
FIG. 6 shows a planar side view of a tapered nanowire tip according to the present invention.

FIG. 6 shows a planar side view of a tapered nanowire tip 600 according to the present invention.

Figure 7:
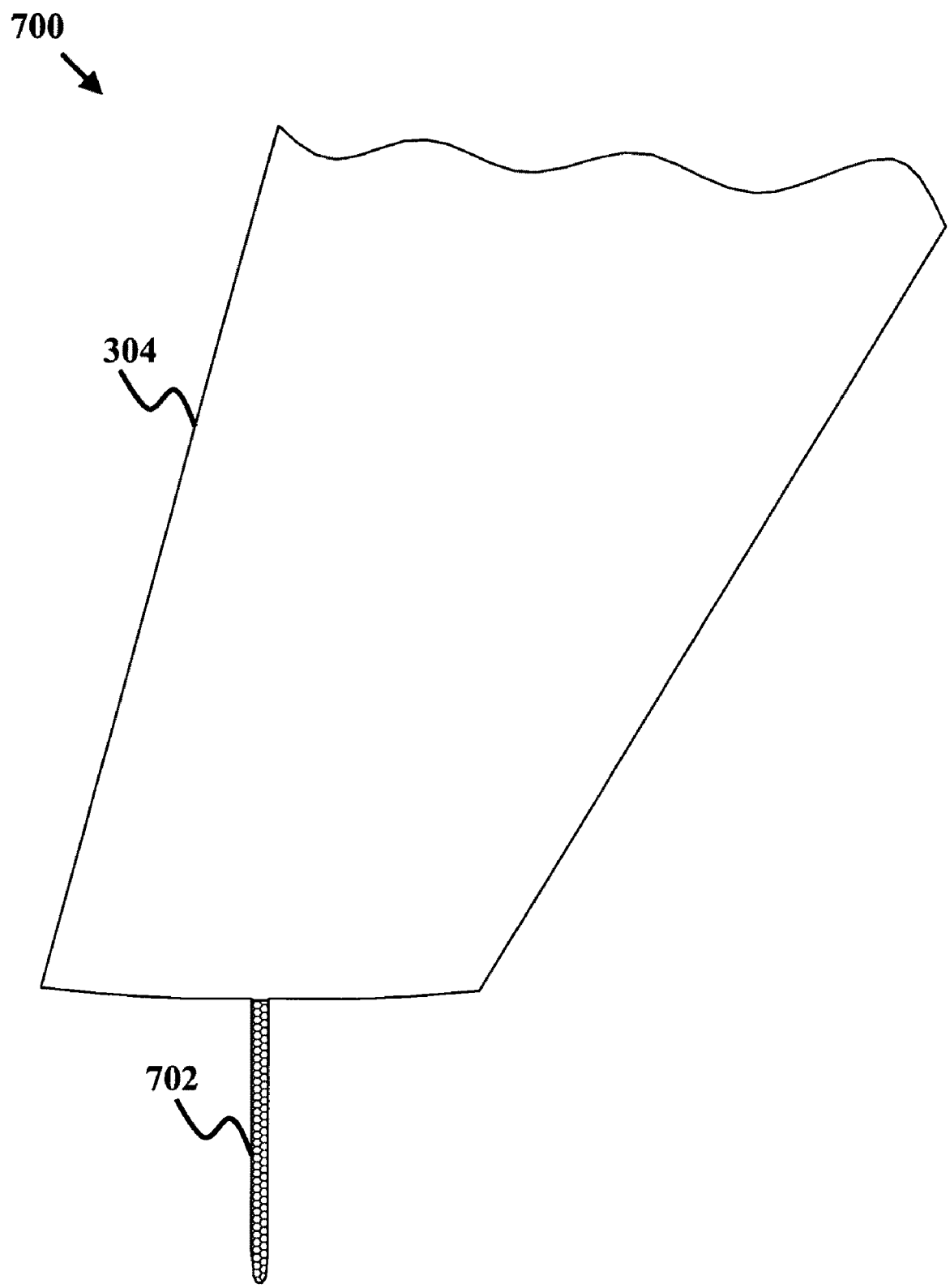
FIG. 7 shows a planar side view of a probe tip having a single all-conductive tapered nanowire according to the present invention.

FIG. 7 shows a planar side view of a probe tip having a single all-conductive tapered nanowire 700 according to the present invention. The metallic nanowire probes 702 can be used for scanning electrochemical microscopy (SECM) applications because of their excellent conductivity. Diameters of existing SECM electrodes are larger than one micrometer. The diameters and lengths of the nanowire probes 702 can be 10 nm to 100,000 nm and 1 µm to 50 µm, respectively. Therefore, this invention dramatically improves the space resolution as well as the aspect ratio of a probe, relative to existing SECM electrodes. The nanowire probe 702 with a tapered tip can be used not only as an AFM tip and an STM tip, but also to generate a local electric field if different potentials are applied to the tip and an imaging surface. This local field is capable of assisting the deposition and etching events such as ALD. Therefore, producing nanoarchitectures such as quantum dots is feasible by using this tip 702. On the other hand, the nanowire probe 702 can be also used as an electrode for electrochemical analysis where a very small region such as in a plant cell is of interest.

Figure 8:
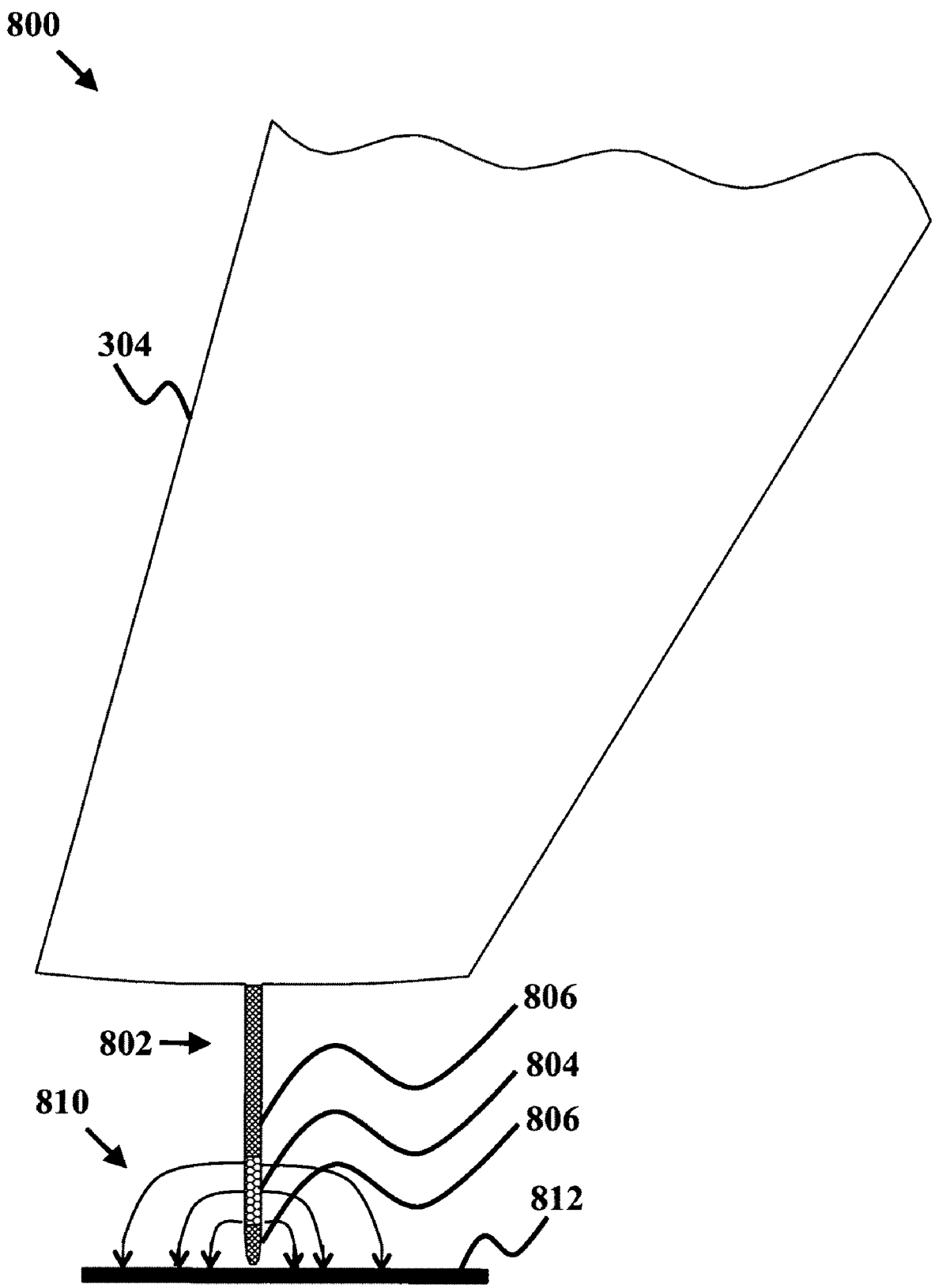
FIG. 8 shows a planar side view of a probe tip having a single partially-conductive tapered nanowire according to the present invention.

FIG. 8 shows a planar side view of a probe tip having a single partially-conductive tapered nanowire 800 according to the present invention. The composition of the nanowires can be changed along the length by electrodeposition in an electrolyte containing different kinds of metal ions. Hence, multiple component nanowires 802 partially containing gold segments 804 can be produced. The gold surface 804 cannot be coated with metal oxide 806 by the ALD process. Therefore, it is possible to control the arrangement of the conducting surface of the nanoprobe by introducing gold segments 804 into the nanowires 802 prior to ALD processing. This technique enables control of the effective probe area and its arrangement. As shown in FIG. 8, The gold segment 804 is inserted in the middle, a multiple component nanowire tip 802 is obtained. The ALD reaction does not take place on a gold surface 804. Therefore, only the gold segment 804 can be left as a conductive surface in the nanowire tip after the ALD process. The other surface is coated with an insulating material like aluminum oxide. This tip 802 produces a ring-shaped electric field 810 to a substrate 812.

Figure 9:
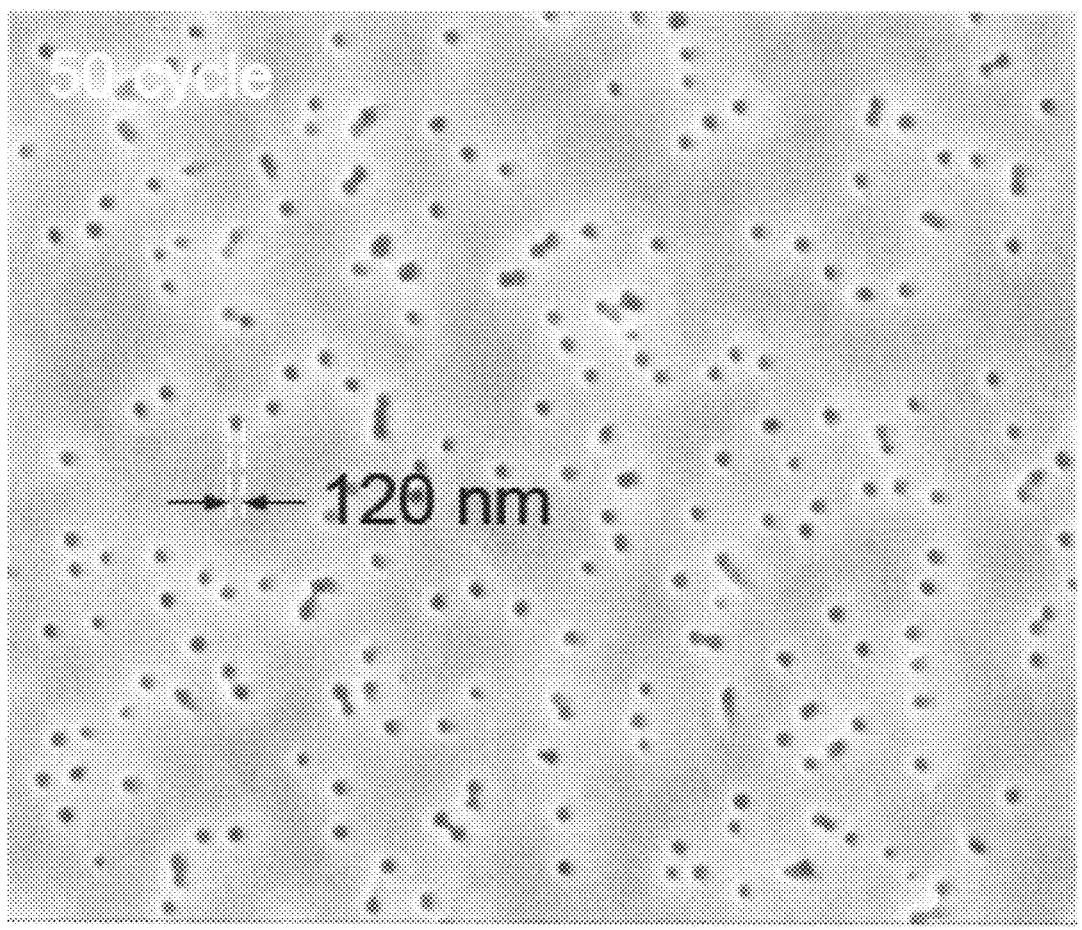
FIGS. 9a-9c show SEM images of pores tapered with increasing number of cycles in the ALD process.
Figure 9:
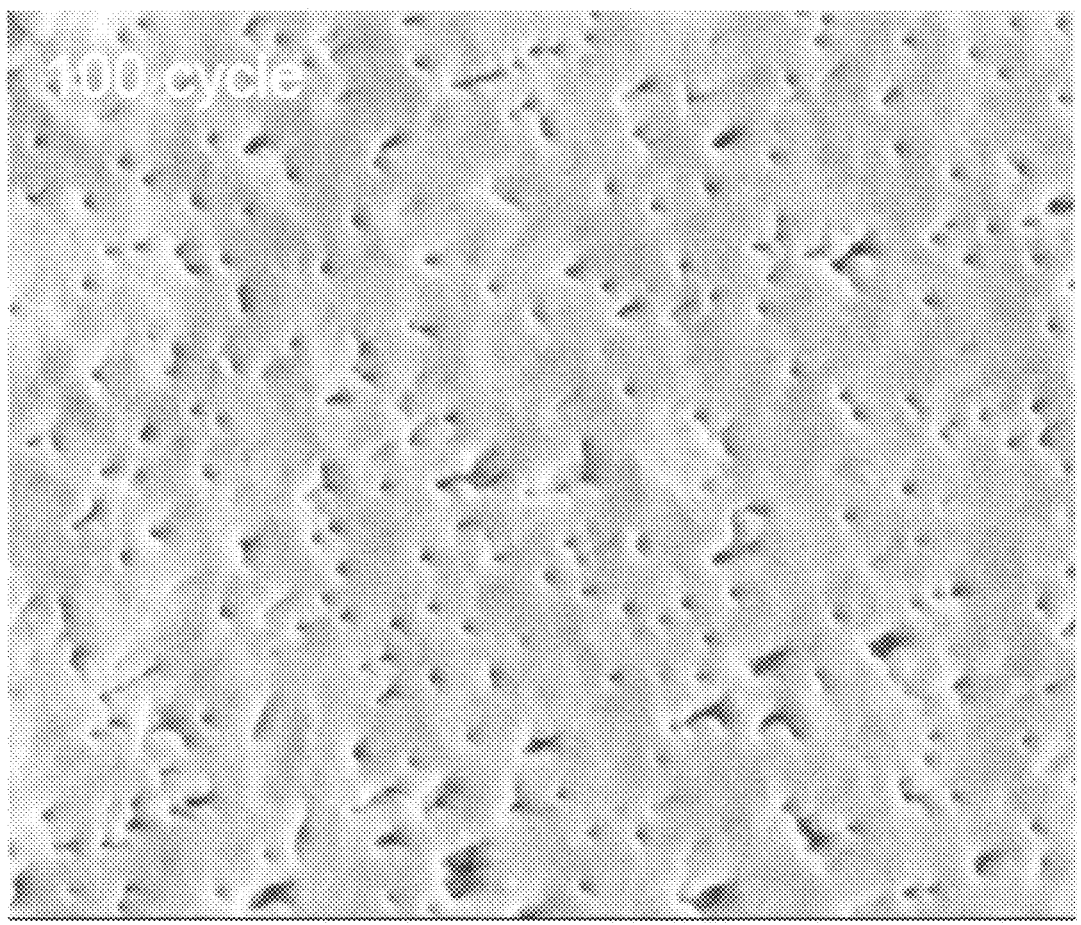
Figure 9:
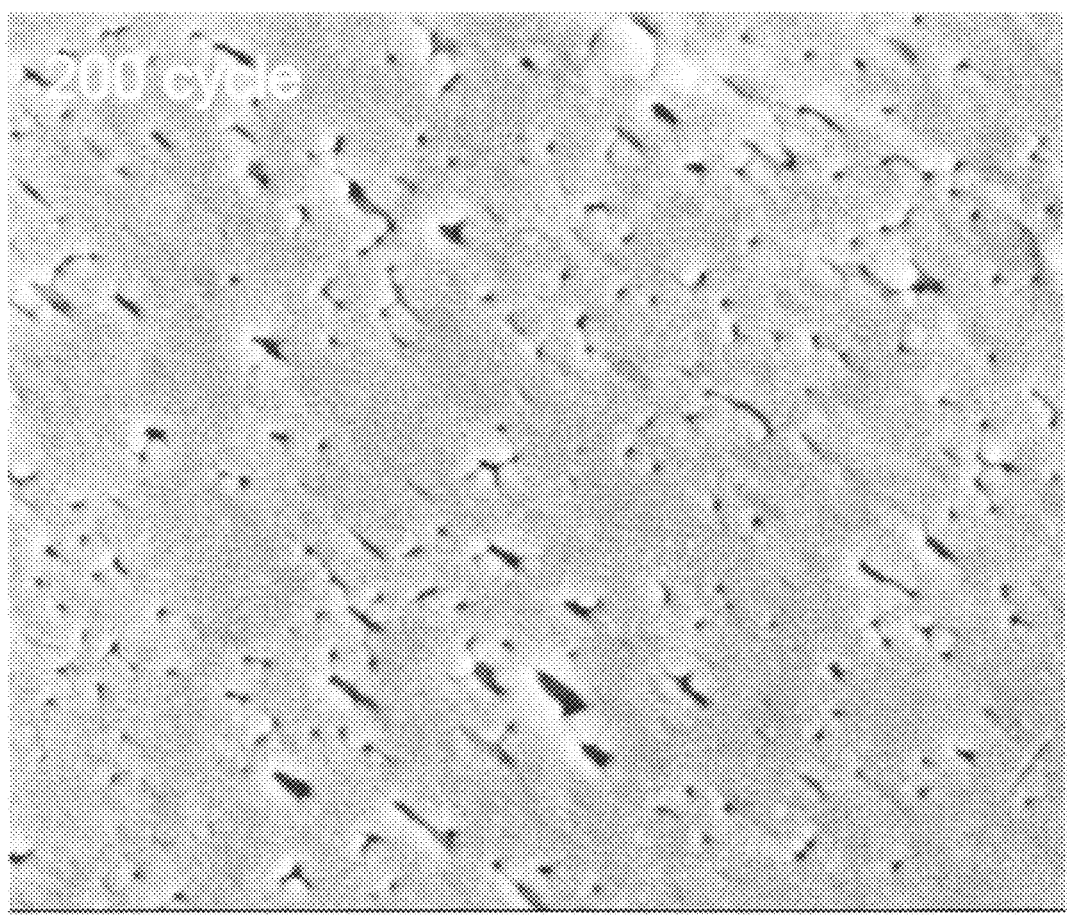

FIGS. 9a-9c show SEM images 900 of pores tapered with increasing the number of cycles in the ALD process. FIG. 9a shows pores having tapers resulting from a 50-cycle ALD process. FIG. 9b shows pores having tapers resulting from a 100-cycle ALD process. FIG. 9c shows pores having tapers resulting from a 200-cycle ALD process. It is evident from the larger number of cycles in the ALD process, that the taper of the pores becomes sharper. By introducing another parameter of exposure times of precursors and oxidizers, a tapered profile of the pores can be controlled better.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, if materials can be deposited by the ALD process, different materials are applicable for creating the new profiles of the pores in this invention. Nanoporous materials such as polycarbonate track etch membrane, porous anodic alumina, track etch mica, porous silicon, and so on are applicable in this invention. Other metal deposition techniques such as electroless deposition for growing the nanowires are applicable in this invention. The tapered metallic nanotubes could be produced by the electroless deposition instead of the electrodeposition.

All such variations are considered to be within the scope and spirit of the present invention as defined by the following claims and their legal equivalents.

What is claimed:

1. A method of making nanowire probes comprising:
   a. providing a template, wherein said template comprises a nanoporous structure;
   b. providing a probe tip, wherein said probe tip is disposed on top of said template; and
   c. growing said nanowires on said probe tip, wherein said nanowires are grown from said probe tip along said nanopores, wherein said nanowires conform to the shape of said nanopores, wherein a probe comprises a probe base and said probe tip, wherein a bottom face of said probe base is adhesively coupled to said template.

2. The method of claim 1, wherein metallic deposition is provided at a region where said tip contacts said template, wherein metallic nanaowires are grown from said probe tip to inside said nanopores.

3. The method of claim 2, wherein said metallic deposition is selected from a group consisting of platinum, gold, copper, iron, and palladium deposition.

4. The method of claim 2, wherein said metallic deposition is by focused-ion-beam (FIB)-assisted deposition.

5. The method of claim 2, wherein a cathode material for electrochemical deposition of said metallic nanowires is selected from a group consisting of platinum gold, copper, iron, and palladium.

* * * * *